United States Patent [19]

Brecz et al.

[11] Patent Number: 4,859,128
[45] Date of Patent: Aug. 22, 1989

[54] SHEATHED COMPOSITE BLIND RIVET

[75] Inventors: Imre Brecz, Rancho Santa Margarita; Dennis Schultz, Fullerton; Dennis L. Hinton, Yorba Linda, all of Calif.

[73] Assignee: Microdot Inc., Darien, Conn.

[21] Appl. No.: 118,547

[22] Filed: Nov. 9, 1987

Related U.S. Application Data

[63] Continuation-in-part of Ser. No. 940,414, Dec. 11, 1986, abandoned, which is a continuation of Ser. No. 727,781, Apr. 26, 1985, abandoned.

[51] Int. Cl.$^4$ ............................................. F16B 13/04
[52] U.S. Cl. ........................................ 411/43; 411/44; 411/70; 411/501; 411/908
[58] Field of Search ..................... 411/34-38, 411/43, 44, 70, 501, 907, 908

[56] References Cited

U.S. PATENT DOCUMENTS

| | | | |
|---|---|---|---|
| 2,061,629 | 11/1936 | Huck | 411/34 |
| 2,510,693 | 6/1950 | Green | 411/501 |
| 2,545,752 | 3/1951 | Singleton | 411/43 |
| 4,376,604 | 3/1983 | Pratt et al. | 411/34 |
| 4,402,638 | 9/1983 | Tanaka | 411/34 |
| 4,451,189 | 5/1984 | Pratt | 411/34 |
| 4,457,652 | 7/1984 | Pratt | 411/38 |
| 4,478,543 | 10/1984 | Lyon | 411/34 |
| 4,478,544 | 10/1984 | Strand | 411/34 |
| 4,718,801 | 1/1988 | Berecz | 411/908 X |

FOREIGN PATENT DOCUMENTS

| | | | |
|---|---|---|---|
| 2360159 | 6/1974 | Fed. Rep. of Germany | 411/34 |
| 812993 | 3/1981 | U.S.S.R. | 411/908 |
| 594859 | 11/1947 | United Kingdom | 411/43 |
| 625331 | 6/1949 | United Kingdom | 411/44 |

Primary Examiner—Gary L. Smith
Assistant Examiner—Suzanne L. Dino
Attorney, Agent, or Firm—Lyman R. Lyon

[57] ABSTRACT

A composite blind rivet wherein a ductile metallic sheath fully covers the blind head forming portion of the rivet before and after deformation thereof so as to preclude protrustion of said fibers upon formation of said blind head. The sheath is initially expanded radially along a thin-walled portion thereof during blind head formation by the hydrostatic pressure generated by axial compression of the rivet's composite core, whereafter axial compression of the sheath supplants the hydrostatic core pressure to radially outwardly buckle the sheath into a blind head preferably of frusto-conical cross-section. Subsequent to blind head formation, the sheath elastically maintains a radially inward bias on the rivet's composite core while elastically axially biasing the anvil from the workpieces, whereby clamp-up force is maintained notwithstanding nominal plastic cold flow of the rivet's composite core during use.

8 Claims, 1 Drawing Sheet

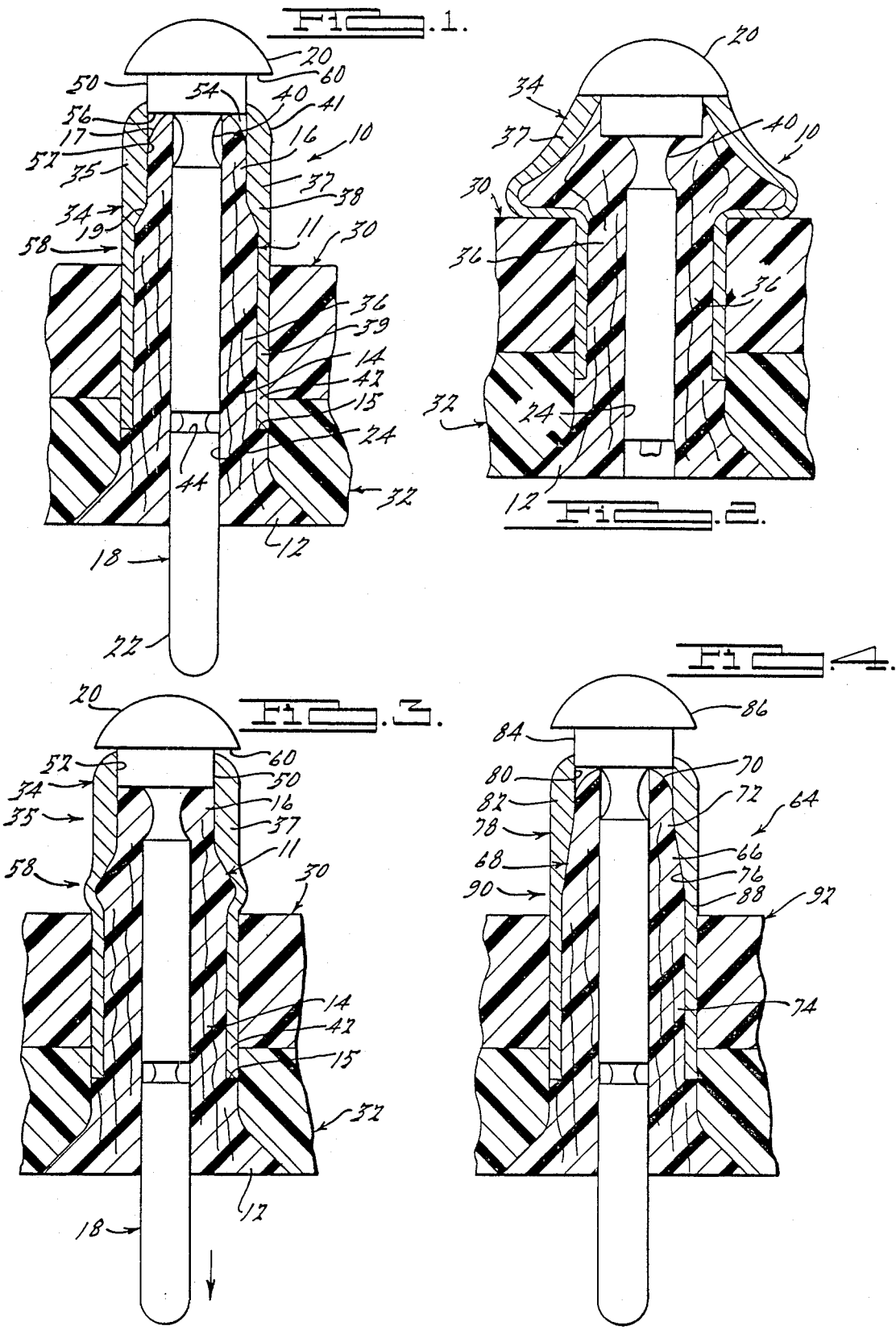

SHEATHED COMPOSITE BLIND RIVET

CROSS-REFERENCE TO RELATED APPLICATIONS

The present application is a continuation-in-part of co-pending application Ser. No. 06/940,414, filed Dec. 11, 1986, which was in turn a continuation of application Ser. No. 06/727,781, filed Apr. 26, 1985, now abandoned.

BACKGROUND OF THE INVENTION

The blind rivet of the instant invention is an improvement on the composite rivet disclosed in U.S. Pat. No. 4,478,544 issued Oct. 23, 1984, for Composite Rivet, and assigned to the assignee hereof.

Carbon fiber reinforced materials are now widely used in the aircraft industry for airframe structural components. However, the use of carbon fiber reinforced resins in blind rivets has been limited by the difficulty of properly forming the blind head. One characteristic of composite materials utilizing carbon fibers is that the material often exhibits a rough finish after reforming due to protrusion or breakage of the carbon fibers. While the structural integrity of the material may not be compromised, the end product is abrasive and aesthetically unsatisfactory. When such material is employed in the reformable head of a blind rivet, the problem becomes acute since the blind head is exposed on the rear surface of the workpiece.

Another problem that must be addressed is that plastic cold flow of the rivet tends to reduce clamp-up forces on a workpiece. Thus, pretensioning of the rivet is highly desirable to offset ultimate relaxation of the tensile forces.

In the '544 patent, a high tensile strength, low modulus tubular sheath encapsulates the composite core of the rivet taught therein so as to prevent the protrusion of reinforcement fibers therefrom subsequent to blind head formation. However, the sheath relies upon the controlled and proper deformation of the underlying composite core to produce a blind head of a configuration suitable for use. It will be appreciated that the uncontrolled, nonuniform radial expansion of the composite core during blind head formation may displace the sheath so as to render its protection unavailing.

Additionally, the sheath as taught in the '544 patent provides no radially inward bias on the rivet's composite core in order to prevent cold flow thereof, nor does the sheath provide an axial bias against the anvil to pretension the rivet and, hence, minimize the reduction of clamp-up force upon plastic cold flow of the shear portion of the rivet's composite core.

SUMMARY OF THE INVENTION

The aforesaid problems are solved by the rivet of the present invention by encapsulating the shear and blind head forming portions of the rivet's tubular composite body in a metallic sheath. The sheath is provided with a thin-walled section proximate to the outer surface of the blind side of the workpiece, and a thick-walled section which radially engages with a radial shoulder of the anvil of the mandrel extending therethrough and which axially engages with an axially-disposed surface of the anvil subsequent to initial axial displacement of the mandrel.

Upon commencement of the heading operation, the sheath operates in association with the radial shoulder of the anvil to form a closed pressure chamber wherein the head-forming portion of the rivet's composite core, which is softened due to the application of heat, is pressurized upon initial axial movement of the mandrel. The pressurized composite core in turn hydrostatically radially expands the thin-wall section of the sheath in a uniform, symmetrical manner. The thick-walled section of the sheath then engages with the axially-disposed surface of the anvil, whereafter the sheath is axially compressed between the anvil and an axially-disposed surface on the tubular composite rivet body upon subsequent axial movement of the mandrel.

The sheath is thus controllably buckled radially outwardly, initially hydrostatically by the radial expansion of the rivet's composite core, and thereafter by the combination of composite core hydrostatics and the axial compression of the sheath. It is significant that the initial uniform, symmetrical hydrostatic deformation of the sheath encourages further uniform, symmetrical buckling of the sheath upon the subsequent mechanical axial compression thereof by the anvil. Thus, a properly-formed blind head is more reliably obtained. Moreover, the sheath is maintained about the head-forming portion of the rivet of the instant invention throughout the heading operation, whereby the projection of the reinforcement fibers therefrom is prevented.

Additionally, since the head-forming portion of the rivet's composite core is maintained in a pressurized state both during and after blind head formation by the sheath, greater core homogeneity, with all its attendant benefits, is achieved. Additionally, the final configuration of the sheath aids in the maintenance of workpiece clamp-up forces by elastically exerting an axial bias against the anvil and the workpieces, while preventing plastic cold flow of the head forming portion of the rivet's tubular composite body subsequent to rivet heading by exerting a radially inward bias thereon.

BRIEF DESCRIPTION OF THE DRAWINGS

FIG. 1 is an elevational view, partially in cross section, of an exemplary embodiment of the blind rivet of the instant invention;

FIG. 2 is a view of the rivet of FIG. 1 after tensioning of the rivet mandrel to form a blind head on the rivet;

FIG. 3 is a view of the rivet of FIG. 1 after initial hydrostatic radial expansion of the thin-walled section of the sheath thereof, immediately prior to the axial engagement of the thick-walled section thereof with an axially-disposed surface on the anvil; and FIG. 4 is an elevation view of an alternate embodiment of the blind rivet of the instant invention.

DETAILED DESCRIPTION OF THE PREFERRED EMBODIMENTS OF THE INVENTION

As best seen in FIG. 1 of the drawings, a composite blind rivet 10 in accordance with an exemplary constructed embodiment of the instant invention comprises a tubular composite body 11, preferably a preform comprised of a carbon fiber-reinforced "B"-stage thermoset resin, having a preformed head portion 12, a shear portion 14 connected to the preformed head portion 12 by a radially extending shoulder 15, and a blind head forming portion 16. The head forming portion 16 of the preform 11 is additionally provided with an end portion 17 of relatively smaller diameter which is connected thereto by a tapered intermediate portion, such as the truncated conical section 19 illustrated in FIG. 1. A mandrel 18 is disposed centrally of the preform 11 and has an anvil 20 at one end thereof overlying the blind head forming portion 16 of the preform 11 and a tensioning stem 22 at the other end thereof. The mandrel 18 is journaled in a complementary aperture 24 that extends through the preformed head, shear and head forming portions 12, 14, and 16, respectively, of the preform 11. The shear portion 14 of the rivet 10 is coextensive with the cumulative thickness of a pair of workpieces 30 and 32.

As seen in FIG. 2 of the drawings, the mandrel 18 is adapted to be pulled, after heating of the preform 11, by a tool (not shown) of conventional design resulting in deformation of head forming portion 16 of the rivet 10 into the mushroom configuration shown.

In accordance with the instant invention, the head forming portion 16 of the rivet 10 is encapsulated by a unitary cylindrical sheath 34, preferably formed of a ductile metal such as titanium, which is buckled radially outwardly to the configuration of the blind head upon the formation thereof, thereby preventing the protrusion of the carbon fibers 36 that are impregnated or encapsulated in the resin matrix thereof. The sheath 34, which is of uniform external diameter prior to deformation, has a thick-walled section 37 on the blind end 41 thereof underlying the anvil 20; a relatively thin-walled section 39 on the end 42 thereof extending through, and radially aligned with, the apertures in workpieces 30 and 32 and abutting radial shoulder 15 of the preform 11; and an intermediate wall section 38 connecting the thick- and thin-walled sections 37 and 39 and shaped so as to complementarily engage with the intermediate portion 19 of the preform 11.

A radial shoulder 50 on the anvil 20 radially engages with the inner surface 52 of the thick-walled section 37 of the sheath 34 to provide a closed pressure chamber 54 wherefrom the head forming portion 16 of the rivet's composite core 11 encapsulated by the sheath 34 cannot escape. Thus, during initial axial displacement of the anvil 20 relative to the preformed head and shear portions 12 and 14 of the rivet 10, the inner axially-disposed surface 56 of the anvil 20 engages with and hydrostatically compresses the head-forming portion 16 of the rivet's composite core 11. The resultant pressurized composite core 11 in turn exerts a uniformly distributed, radially outward hydrostatic force on the sheath 34.

The part of the thin-walled section 39 of the sheath 34 indicated generally at 58 thus begins to yield plastically to the hydrostatic pressure of the composite core 11 and is uniformly and symmetrically radially outwardly expanded thereby, as illustrated in FIG. 3 of the drawings. The initiation of radially outward buckling of the sheath 34 is thus precisely controlled by the hydrostatic pressure induced in the composite core 11 and the presence of thin-wall section 58. It is noted that the thick-walled section 37 of the sheath 34 preferably commences well above the workpiece 30, thereby providing a sufficient length of thin-walled section 58 to accommodate radial deflection thereof and, thus, helping define the ultimate truncated conical cross-section of the blind head forming portion 35 of the rivet.

It is significant that the composite core 11 is fully contained by the sheath 34 during blind head formation so that the sheath 34 is initially expanded radially outwardly by the resultant hydrostatic pressure of the composite core 34. To that end, it is desirable for the sheath 34 to extend substantially through the entire thickness of workpieces 30 and 32, as illustrated in the drawings.

The resultant uniformly radially expanded thin-walled section 58 of the sheath 34 thereafter encourages further uniform and symmetrical radially outward buckling of the sheath 34 as by mechanical axial compression thereof upon engagement of the blind end 41 of the sheath 34 with a complementary axially-disposed surface 60 of the anvil 20. Thus, upon further axial movement of the mandrel 18, the axially-disposed surface 60 engages with the blind end 41 of the sheath 34, whereafter the sheath 34 is mechanically axially compressed between anvil surface 60 and the axially-disposed radial shoulder 15 of the preform 11. It is noted that, as the compressive load during such further deformation of the sheath 34 is borne by radial shoulder 15 of the preform 11, damage to the workpieces 30 and 32 by the so-called "cookie-cutter effect" is avoided by the rivet 10 of the instant invention.

From the foregoing it should be apparent that a smooth exterior surface is presented on the blind head which is not abrasive and is aesthetically pleasing. Moreover, subsequent to blind head formation on the rivet 10, the sheath 34 maintains a radially inward pressure on the composite core 11 during the curing thereof, whereby greater homogeneity of the composite core 11 is achieved, thereby ensuring positive impregnation of the reinforcement fibers therein, and producing greater uniformity in the physical properties thereof. Moreover, the sheath 34 tends to maintain the cured composite core 11 in a compacted state, thereby preventing undesirable radial plastic cold flow thereof during use which would otherwise result in a reduction of clamp-up force.

Additionally, the sheath 34 elastically biases the anvil 20 axially from the workpieces 30 and 32 subsequent to blind head formation, whereby clamp-up force is maintained notwithstanding nominal axial plastic cold-flow of the shear portion 14 of the rivet's composite core 11 during use.

In accordance with another feature of the instant invention, the mandrel 18 is provided with an annular groove 40 in the stem 22 thereof into which resin flows thereby tensioning the mandrel and locking it within the head forming portion 16 of the rivet 10. A breakoff groove 44 is provided in the stem 22 to facilitate removal of excess stem portion after setting of the rivet 10. It is noted that pressurization of the composite core 11 within the closed pressure chamber 54 comprised of sheath 34 and anvil 20 further ensures that groove 40 is completely filled with resin during formation of blind head 35 on the rivet 10, as illustrated in FIG. 2.

An alternate embodiment 64 of the rivet of the instant invention is illustrated in FIG. 4, wherein the tapered intermediate portion 66 of the rivet preform 68 connecting the end 70 of the head forming portion 72 thereof with the shear portion 74 thereof, and the corresponding intermediate wall section 76 of the sheath 78 encompassing the preform 68, are characterized by a more gentle taper. It is to be noted, however, that the cylindrical inner surface 80 of the thickwalled section 82 of the sheath 78 extends axially sufficiently to ensure radial contact between the surface 80 and the radial shoulder 84 of the anvil 86 throughout initial hydrostatic expansion of the thinwalled section 88 of the sheath 78. It is noted that, with the more gentle taper employed with the alternate embodiment 64, initial hydrostatic buckling of the sheath 78 will occur along the thin-walled section 88 thereof at the point thereon indicated generally by reference numeral 90, in close proximity to workpiece 92.

While the preferred embodiment of the invention has been disclosed, it should be appreciated that the invention is susceptible of modification without departing from the scope of the following claims.

I claim:

1. In a composite blind rivet comprising
   a tubular composite body comprising reinforcement fibers encapsulated in a heat deformable resin matrix, said tubular body having a preformed head portion, a shear portion, and a portion thereof deformable to form a blind head thereon, and
   a mandrel extending centrally of said tubular body and having a stem portion at one end and an anvil at the other end overlying the blind head forming portion of said tubular body, said mandrel being movable axially relative to the shear and preformed head portions of said tubular body to form a blind head thereon;
   the improvement comprising
   a metallic sheath encompassing the head forming portion of said tubular body and a part of the shear portion thereof:
   an end of said sheath abutting an axially-disposed surface on said tubular body: and
   the other end of said sheath radially engaging with a radial shoulder of the anvil of said mandrel to form a closed pressure chamber encapsulating the head forming portion and said part of the shear portion of said tubular body, said other end of said sheath being axially engageable with an axially-disposed surface of the anvil of said mandrel during rivet head formation subsequent to initial axial movement of said mandrel:
   whereby axial displacement of the anvil of said mandrel initially axially compresses said tubular body within said pressure chamber, said compressed tubular body hydrostatically uniformly radially expanding the thin-walled section of said sheath; whereafter said sheath is mechanically axially compressed between the axially-disposed surface of the anvil of said mandrel and said axially-disposed surface of said tubular body portion; and whereupon said sheath is further controllably buckled along the thin-walled section thereof during the formation of the blind head on said rivet.

2. The rivet of claim 1 wherein said axially-disposed surface on said tubular body comprises a radially extending shoulder formed on the shear portion thereof.

3. The rivet of claim 1 wherein said metallic sheath elastically exerts a radially inward bias on the head forming portion of said tubular body subsequent to the formation of the blind head therefrom.

4. The rivet of claim 1 wherein said metallic sheath elastically biases the anvil of said mandrel from said workpieces, whereby clamp-up force between said workpieces is maintained subsequent to plastic cold flow of the shear portion of said tubular body.

5. A method of controllably buckling radially outwardly a sheath fully encompassing the blind head forming portion of a rivet having a composite core, said sheath having a thin-walled section and a thick-walled section, said buckling method comprising the steps of:
   (a) compressing said composite core, whereby the thin-walled section of said sheath is hydrostatically radially expanded to
   initiate buckling of said sheath at the thin-walled section thereof; and
   (b) mechanically axially compressing said sheath subsequent to said initial hydrostatic buckling thereof, whereby further radially outward buckling of said sheath is achieved.

6. The method of claim 5 including the step of softening said composite core prior to the compressing thereof, whereby flow of said composite core during such subsequent compression step is facilitated.

7. The method of claim 6 wherein said softening step comprises heating said composite core.

8. A method of controllably buckling radially outwardly a metallic sheath fully encompassing the blind head forming portion of a rivet having a composite core, said sheath having a thin-walled section and a thick-walled section, the thick-walled section of said sheath being axially engageable with an anvil on a mandrel extending axially therethrough, said buckling method comprising the steps of:
   (a) softening said composite core to facilitate the flow thereof:
   (b) compressing said composite core, whereby the thin-walled section of said sheath is hydrostatically radially expanded to initiate buckling of said sheath at the thinwalled section thereof:
   (c) axially engaging said anvil with said thick-walled section of said sheath subsequent to said initial hydrostatic buckling thereof; and
   (d) mechanically axially compressing said sheath, whereby further radially outward buckling of said sheath is achieved.

* * * * *